United States Patent
Zheng et al.

(10) Patent No.: US 12,160,107 B1
(45) Date of Patent: Dec. 3, 2024

(54) INVERTER SYSTEM WITH REACTIVE POWER SUPPORT AND CONTROL METHOD THEREOF

(71) Applicant: FOXESS CO., LTD, Wenzhou (CN)

(72) Inventors: Chongfeng Zheng, Wenzhou (CN); Zhijiang Deng, Wenzhou (CN); Chuntao Li, Wenzhou (CN); Jian Peng, Wenzhou (CN)

(73) Assignee: Foxess Co., Ltd, Wenzhou (CN)

( * ) Notice: Subject to any disclaimer, the term of this patent is extended or adjusted under 35 U.S.C. 154(b) by 0 days.

(21) Appl. No.: 18/666,783

(22) Filed: May 16, 2024

(30) Foreign Application Priority Data

Jul. 11, 2023 (CN) .......................... 202310841067.7

(51) Int. Cl.
*H02J 3/18* (2006.01)
*H02M 1/00* (2007.01)
*H02M 7/5387* (2007.01)

(52) U.S. Cl.
CPC ........... *H02J 3/1842* (2013.01); *H02M 1/007* (2021.05); *H02M 7/53871* (2013.01)

(58) Field of Classification Search
CPC ................. H02J 3/1842; H02M 1/007; H02M 7/53871; H02M 7/797; Y02E 40/40
See application file for complete search history.

(56) References Cited

U.S. PATENT DOCUMENTS

| 11,012,002 | B1* | 5/2021 | Xu ....................... H02M 7/5387 |
| 2012/0140533 | A1* | 6/2012 | Li .......................... H02J 3/381 363/37 |
| 2018/0152118 | A1* | 5/2018 | Friebe ..................... H02M 1/42 |

FOREIGN PATENT DOCUMENTS

| CN | 110380637 A | * | 12/2019 | ................ H02J 3/01 |
| CN | 102856916 A | | 1/2023 | |
| CN | 110380637 B | * | 4/2024 | ................ H02J 3/01 |
| WO | WO-2015054157 A1 | * | 4/2015 | .............. H02M 1/36 |
| WO | WO-2020182083 A1 | * | 9/2020 | ............ H02M 1/126 |

OTHER PUBLICATIONS

Translation CN 110380637 A.*
Translation CN 110380637 B.*
Translation WO2020182083.*
Translation WO2015054157.*

* cited by examiner

*Primary Examiner* — Thienvu V Tran
*Assistant Examiner* — Yahveh Comas Torres
(74) *Attorney, Agent, or Firm* — AP3 Law Firm PLLC (57) ABSTRACT

An inverter system includes an inverter bridge, an inductor and a controller. The inverter bridge includes first, second, third and fourth power switches. The inductor is connected between the inverter bridge and a power grid. The controller is configured to control both the second power switch and the third power switch to be turned on or both the first power switch and the fourth power switch to be turned on within a first time period of each power frequency cycle. The first time period is from a moment when a current of the power grid becomes zero to a moment when a voltage of the power grid becomes zero. The current of the power grid is in inverse phase with the voltage of the power grid in the first time period, so that reactive power is stored in the inductor.

18 Claims, 4 Drawing Sheets

FIG. 8 ized electrolytic capacitor, and its capacitance value ranges from tens of uF to hundreds of uF.
INVERTER SYSTEM WITH REACTIVE POWER SUPPORT AND CONTROL METHOD THEREOF

CROSS-REFERENCE TO RELATED APPLICATIONS

This application claims priority to Chinese Patent Application No. 202310841067.7, filed on Jul. 11, 2023, and entitled "INVERTER SYSTEM WITH REACTIVE POWER SUPPORT AND CONTROL METHOD THEREOF," which is hereby incorporated by reference herein as if reproduced in its entirety.

FIELD OF TECHNOLOGY

The present disclosure relates to the field of power grid dispatching, and in particular to an inverter system with reactive power support and a control method thereof.

BACKGROUND

Reactive power support is a function to stabilize a power grid in power grid dispatching, which is a relatively difficult technical point in a grid-connected photovoltaic inverter.

Figure 1:
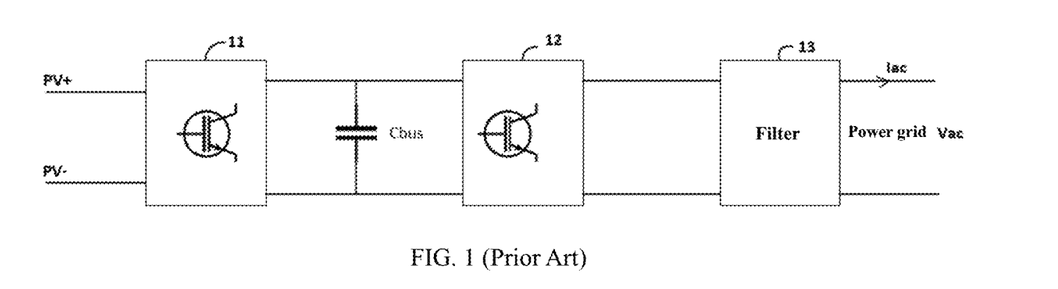
FIG. 1 is a schematic structural diagram of an existing inverter system with reactive power support.

As shown in FIG. 1, an existing inverter system with reactive power support includes a converter 11, a capacitor Cbus, an inverter bridge 12 and a filter 13. An input end of the converter 11 is used for receiving voltages PV+ and PV− output by a photovoltaic module; an input end of the inverter bridge 12 is connected with an output end of the converter 11; an input end of the filter 13 is connected with an output end of the inverter bridge 12; an output end of the filter 13 is connected to a power grid; and the bus capacitor Cbus is connected in parallel to the output end of the converter 11, wherein the bus capacitor is a large-capacity electrolytic capacitor, and its capacitance value ranges from tens of uF to hundreds of uF.

Figure 2:
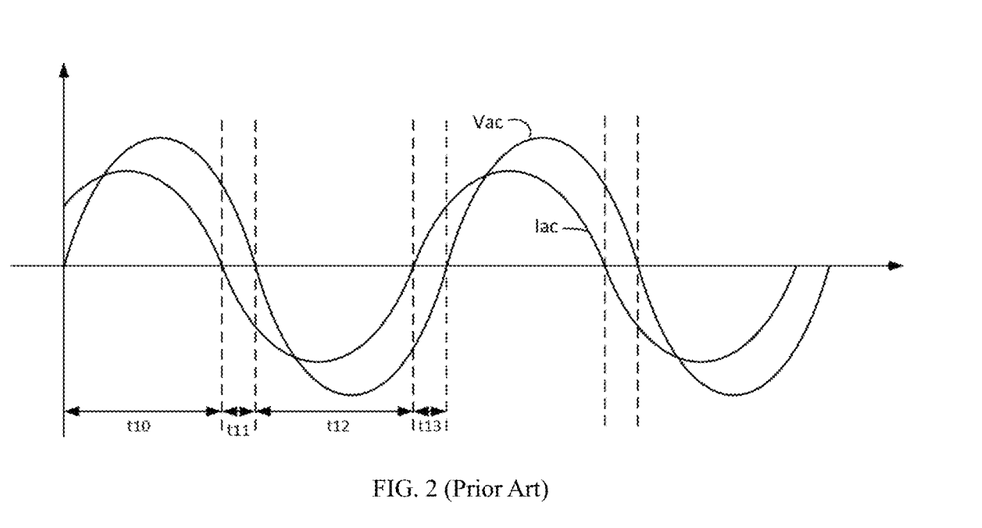
FIG. 2 shows voltage and the current waveforms of a power grid in FIG. 1.

In conjunction with FIG. 1 and FIG. 2, by controlling a power switch of the inverter bridge 12, there is a phase difference between a voltage Vac and a current Iac of the power grid, that is, the voltage Vac and the current Iac are out of phase. As shown in FIG. 2, within a time period t10, the voltage Vac is greater than 0, the current Iac is greater than 0 and output power Po=∫(Vac·Iac)dt is greater than 0, and at this time, the inverter bridge 12 outputs power to the power grid; within a time period t11, the voltage Vac is greater than 0, the current Iac is less than 0, the output power Po=∫(Vac·Iac)dt is less than 0, and the inverter bridge 12 no longer outputs power to the power grid, but absorbs power from the power grid; within a time period t12, the voltage Vac is less than 0, the current Iac is less than 0 and the output power Po=∫(Vac·Iac)dt is greater than 0, and at this time, the inverter bridge 12 outputs power to the power grid; within a time period t13, the voltage Vac is less than 0, the current Iac is greater than 0, the output power Po=∫(Vac·Iac)dt is less than 0, and the inverter bridge 12 no longer outputs power to the power grid, but absorbs power from the power grid; therefore, it is necessary to have a capacitor Cbus to absorb this part of power, which is reactive power; it can be seen that reactive power absorption occurs twice in one power frequency cycle, which is not conducive to the calculation and control of the reactive power.

As shown in FIG. 1, when the voltage Vac and the current Iac are out of phase, the current Iac reversely flows into the bus capacitor Cbus, and the reactive power is stored through the bus capacitor Cbus, so that the reactive power support for the power grid is implemented.

For the inverter bridge without a large bus capacitor, there is no way to do the reactive power support. Therefore, how to implement the reactive power support without the large bus capacitor is one of the hot problems which are always concerned in the field of power grid dispatching.

SUMMARY

The present disclosure aims to provide an inverter system with reactive power support and a control method thereof, which can implement the reactive power support of a power grid under the condition of saving a large-capacity electrolytic capacitor, thereby reducing the cost and volume of the system.

In order to achieve the above objectives, the present disclosure provides an inverter system with reactive power support, including: an inverter bridge, wherein the inverter bridge includes a first power switch, a second power switch, a third power switch and a fourth power switch, a first end of the first power switch is connected with a first end of the fourth power switch, a second end of the first power switch is connected with a first end of the second power switch, a second end of the fourth power switch is connected with a first end of the third power switch, and a second end of the second power switch is connected with a second end of the third power switch.

The inverter system further includes an inductor connected between the inverter bridge and the power grid.

The inverter system also includes a controller respectively connected with a control end of the first power switch, a control end of the second power switch, a control end of the third power switch and a control end of the fourth power switch, and configured to control both the second power switch and the third power switch to be turned on or both the first power switch and the fourth power switch to be turned on within a first time period of each power frequency cycle, wherein the first time period is a period from a moment when a current of the power grid becomes zero to a moment when a voltage of the power grid becomes zero, and the current of the power grid and the voltage of the power grid are inverted within the first time period, so that reactive power is stored in the inductor.

Optionally, the controller is configured to control a duration of a third time period before the first time period according to the reactive power to be generated by the inverter system, wherein the voltage and the current of the power grid are in phase within the third time period, and the current of the power grid is a steamed bun wave.

Optionally, the controller is configured to control both the second power switch and the third power switch to be turned on or both the first power switch and the fourth power switch to be turned on within a second time period after the first time period, such that the reactive power stored by the inductor is fed back to the power grid, wherein the second time period is a period from a moment when the voltage of the power grid crosses zero to a moment when the current of the power grid crosses zero.

Optionally, the inductor is connected between the second end of the first power switch and a first end of the power grid; or the inductor is connected between the second end of the fourth power switch and a second end of the power grid.

Optionally, the inductor includes a first inductor and a second inductor, wherein the first inductor is connected between the second end of the first power switch and the first end of the power grid, and the second inductor is connected between the second end of the fourth power switch and the second end of the power grid.

Optionally, the inverter system further includes a filter capacitor, wherein the filter capacitor is connected between the first end of the first power switch and the second end of the second power switch, and a capacitance value of the filter capacitor ranges from tens of nF to hundreds of nF.

Optionally, the filter capacitor is a thin film capacitor, a high-voltage ceramic capacitor or a high-molecular polymer capacitor.

Optionally, within a third time period before the first time period, the controller controls the duration of the third time period by outputting high-frequency switch control signals for controlling the first power switch and the third power switch or high-frequency switch control signals for controlling the second power switch and the fourth power switch.

Optionally, the inverter system further includes a converter, an input end of the converter is connected with an external power supply, an output end of the converter is connected with an input end of the inverter bridge, and the controller is connected with a power switch of the converter.

Optionally, within the third time period after the first time period, the controller controls the duration of the third time period by outputting a switch control signal for controlling the power switch of the converter.

Optionally, the converter is a flyback, an LLC, buck, or boost.

Optionally, the inverter bridge further includes a fifth power switch and a sixth power switch; a first end of the fifth power switch is connected with a first end of the fourth power switch, a second end of the fifth power switch is connected with a first end of the sixth power switch, and a second end of the sixth power switch is connected with a second end of the third power switch; and the controller is respectively connected with a control end of the fifth power switch and a control end of the sixth power switch.

Based on the same inventive concept, the present disclosure also provides a control method of an inverter system with reactive power support, wherein the inverter system includes an inverter bridge, an inductor and a controller; the inverter bridge includes a first power switch, a second power switch, a third power switch and a fourth power switch; a first end of the first power switch is connected with a first end of the fourth power switch, a second end of the first power switch is connected with a first end of the second power switch, a second end of the fourth power switch is connected with a first end of the third power switch, and a second end of the second power switch is connected with a second end of the third power switch; the inductor is connected between the inverter bridge and a power grid; the controller is respectively connected with the first power switch, the second power switch, the third power switch and the fourth power switch; the control method includes: controlling both the second power switch and the third power switch to be turned on or both the first power switch and the fourth power switch to be turned on within a first time period of each power frequency cycle, wherein the first time period is a period from a moment when a current of the power grid becomes zero to a moment when a voltage of the power grid becomes zero, and the current of the power grid and the voltage of the power grid are inverted within the first time period, so that reactive power is stored in the inductor.

Optionally, a duration of a third time period before the first time period is controlled according to the reactive power to be generated by the inverter system, wherein the voltage and the current of the power grid are in phase within the third time period, and the current of the power grid is a steamed bun wave.

Optionally, the control method further includes: controlling both the second power switch and the third power switch to be turned on or both the first power switch and the fourth power switch to be turned on within a second time period after the first time period, such that the reactive power stored by the inductor is fed back to the power grid, wherein the second time period is a period from a moment when the voltage of the power grid crosses zero to a moment when the current of the power grid crosses zero.

Optionally, the control method further includes: within a third time period before the first time period, controlling both the first power switch and the third power switch to be turned on or both the first power switch and the third power switch to be in a high-frequency switching state, or, controlling both the second power switch and the fourth power switch to be turned on or both the second power switch and the fourth power switch to be in a high-frequency switching state, such that the inverter bridge provides active power to the power grid, wherein the third time period is a period from a starting moment of each power frequency cycle to a moment when the current of the power grid crosses zero; and within a fourth time period after the second time period, controlling both the first power switch and the third power switch to be turned on or both the second power switch and the fourth power switch to be turned on, such that the inverter bridge provides active power to the power grid, wherein the fourth time period is a period from a moment when the current of the power grid crosses zero to a moment when the current and voltage of the power grid both cross zero.

Optionally, within the third time period, the controller controls the duration of the third time period by outputting high-frequency switch control signals for controlling the first power switch and the third power switch or high-frequency switch control signals for controlling the second power switch and the fourth power switch.

Optionally, the inverter system further includes a converter, an input end of the converter is connected with an external power supply, an output end of the converter is connected with an input end of the inverter bridge, and the controller is connected with a power switch of the converter; and the control method further includes controlling the power switch of the converter to control the duration of the third time period.

Compared with the prior art, the technical solution of the present disclosure has at least the following beneficial effects: by controlling both the second power switch and the third power switch of the inverter bridge to be turned on or controlling both the first power switch and the fourth power switch to be turned on by the controller within the first time period of each power frequency cycle, such that the reactive power required to be sent by the inverter system is stored in the inductor; reactive power is stored only once in one power frequency cycle, which is more conducive to calculation and control; and the reactive power support of the power grid is implemented without the large-capacity electrolytic capacitor, thereby reducing the cost and volume of the system.

BRIEF DESCRIPTION OF THE DRAWINGS

For a more complete understanding of the present disclosure, and the advantages thereof, reference is now made to the following descriptions taken in conjunction with the accompanying drawings, in which.

DESCRIPTION OF ILLUSTRATIVE EMBODIMENTS

The technical solutions in the present disclosure will be described clearly and completely with reference to the accompanying drawings, and it is obvious that the described embodiments are some, but not all embodiments of the present disclosure. Based on the embodiments in the present disclosure, all other embodiments obtained by those of ordinary skill in the art without any creative work belong to the scope of protection of the present disclosure.

It will be understood that the present disclosure may be embodied in many different forms and should not be construed as limited to the embodiments set forth herein. Rather, these embodiments are provided so that this disclosure will be thorough and complete, and will fully convey the scope of the present disclosure to those skilled in the art. In the drawings, the size and relative sizes of layers and regions may be exaggerated for clarity, and like reference numerals designate like elements throughout. It will be understood that when an element or layer is referred to as being "on . . . ", "adjacent to . . . ", "connected to" or "coupled to" another element or layer, it can be directly on, adjacent to, connected to or coupled to the other element or layer, or intervening elements or layers may be present. In contrast, when an element is referred to as being "directly on . . . ", "directly adjacent to . . . ", "directly connected to" or "directly coupled to" another element or layer, there is no intervening element or layer. It will be understood that, although the terms "first", "second", "third", etc. may be used to describe various elements, components, regions, layers and/or parts, these elements, components, regions, layers and/or parts should not be limited by these terms. These terms are only used to distinguish one element, component, region, layer or part from another element, component, region, layer or part. Therefore, a first element, component, region, layer or part discussed below can be referred to as a second element, component, region, layer or part without departing from the teachings of the present disclosure.

Spatial relational terms such as "beneath", "under", "following", "below", "above" and "on" can be used here for convenience of description to describe the relationship between one element or feature shown in the figure and another element or feature. It will be understood that in addition to orientations shown in the drawings, the spatial relationship terms are intended to include different orientations of devices in use and operation. For example, if the device in the drawing is turned over, then an element or feature described as "under" or "below" or "beneath" another element will be oriented "on" the other element or feature. Thus, the exemplary terms "under" and "beneath" may include both upper and lower orientations. The device may be otherwise oriented (rotated by 90 degrees or other orientations) and the spatial descriptors used herein are interpreted accordingly.

The terms used herein are for the purpose of describing specific embodiments only and are not used as a limitation of the present disclosure. As used herein, singular forms of "a", "an" and "said/the" are also intended to include plural forms unless the context clearly indicates otherwise. It should also be understood that the terms "consisting of" and/or "comprising", when used in this description, specify the presence of said features, integers, steps, operations, elements and/or components, but do not exclude the presence or addition of one or more other features, integers, steps, operations, elements, components and/or groups. As used herein, the term "and/or" includes any and all combinations of related listed items.

Figure 3:
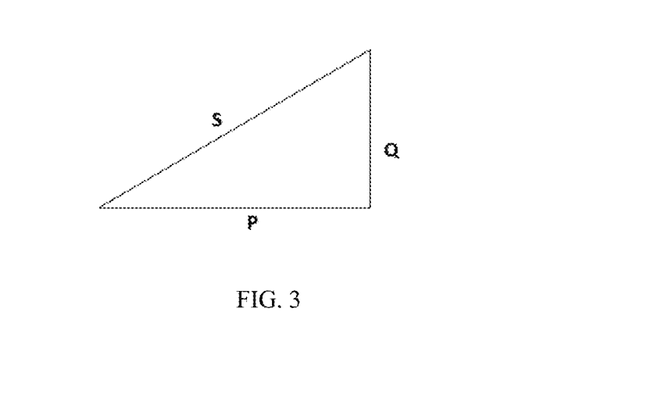
FIG. 3 shows a relationship among active power, reactive power and apparent power.

In an alternating current (AC) power grid of this embodiment, apparent power S represents the product of an effective value of an AC voltage and an effective value of an AC current, that is, $S=Vac_{RMS} \times Iac_{RMS}$. Active power P refers to an average value of integrals of instantaneous power sent or consumed by a load in a power frequency cycle, which is also called average power $P=\int(Vac \cdot Iac)dt$; and reactive power Q refers to the fact that a voltage at both ends of an electric reactor (such as a capacitor or an inductor) in a circuit has a 90 phase difference with a current flowing through it, so it cannot do work or consume active power, but it participates in energy exchange of the power grid and reduces the power supply efficiency. As shown in FIG. 3, a relationship among the apparent power S, the active power P and the reactive power Q is $Q^2=S^2-P^2$.

In the prior art, a large-capacity electrolytic capacitor needs to be connected in parallel at an input end of an inverter bridge for reactive power support. If the input end of the inverter bridge is not allowed to be connected in parallel with the large-capacity electrolytic capacitor, there is no way to do reactive power support. The present disclosure is suitable for application occasions where the input end of the inverter bridge is not allowed or does not need to be connected in parallel with the large-capacity electrolytic capacitor.

Figure 4:
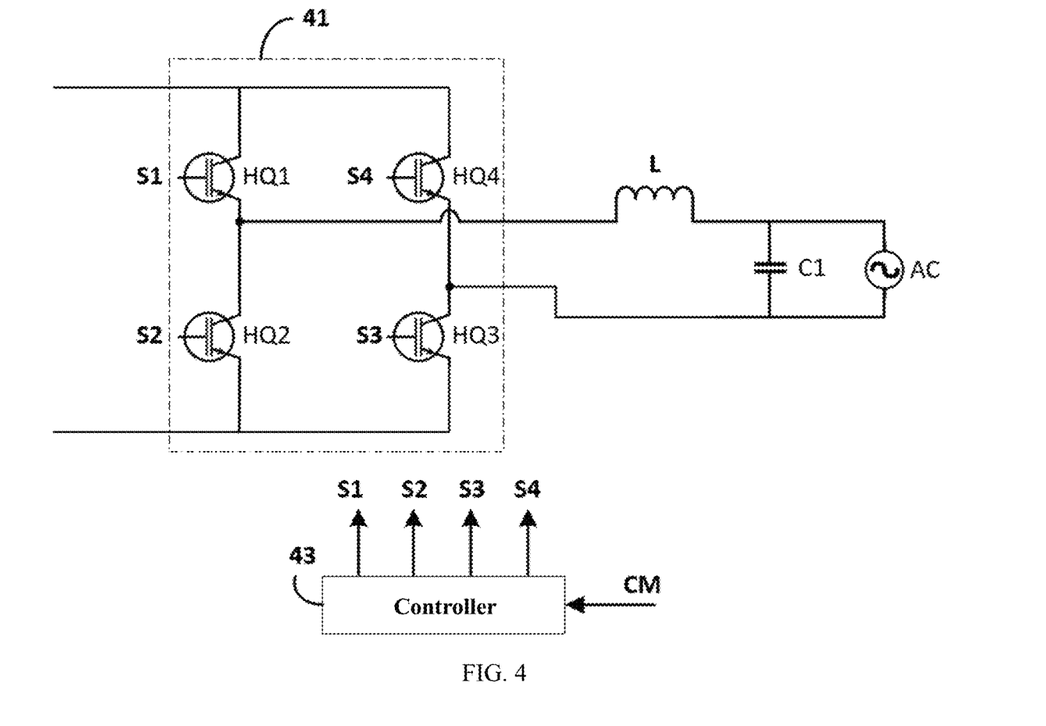
FIG. 4 is a schematic structural diagram of an inverter system with reactive power support according to an embodiment of the present disclosure.

In an embodiment of the present disclosure, there is provided an inverter system with reactive power support, with reference to the structural schematic diagram of the inverter system with reactive power support in an embodiment of the present disclosure shown in FIG. 4. The inverter system with reactive power support according to an embodiment of the present disclosure includes: an inverter bridge 41, wherein the inverter bridge 41 includes a first power switch HQ1, a second power switch HQ2, a third power switch HQ3 and a fourth power switch HQ4, a first end of the first power switch HQ1 is connected with a first end of the fourth power switch HQ4, a second end of the first power switch HQ1 is connected with a first end of the second power switch HQ2, a second end of the fourth power switch HQ4 is connected with a first end of the third power switch HQ3, and a second end of the second power switch HQ2 is connected with a second end of the third power switch HQ3;

an inductor L connected between the inverter bridge and a power grid AC; and a controller 43 respectively connected with a control end of the first power switch HQ1, a control end of the second power switch HQ2, a control end of the third power switch HQ3 and a control end of the fourth power switch HQ4, and configured to control both the second power switch HQ2 and the third power switch HQ3 to be turned on or both the first power switch HQ1 and the fourth power switch HQ4 to be turned on within a first time period of each power frequency cycle, such that the inductor L is short-circuited, wherein the first time period is a period from a moment when a current of the power grid AC crosses zero to a moment when a voltage of the power grid AC crosses zero, and the current of the power grid AC and the voltage of the power grid AC are inverted within the first time period, so that reactive power is stored in the inductor.

The inductor L is necessary for an output side of the inverter bridge. In this embodiment, the controller controls both the second power switch HQ2 and the third power switch HQ3 to be turned on or both the first power switch HQ1 and the fourth power switch HQ4 to be turned on within the first time period of each power frequency cycle, such that the inductor L is short-circuited, and reactive energy is stored in the inductor L, and the existing inductor L in the inverter system is used to complete the reactive power support, so that the reactive power support is completed without the large-capacity electrolytic capacitor, and the cost and volume of the system are reduced accordingly.

In this embodiment, the inverter system further includes an output capacitor C1, wherein the output capacitor C1 is connected in parallel at both ends of the power grid AC, and the output capacitor C1 is used to reduce high-frequency ripples flowing into the power grid AC.

In this embodiment, the controller 43 outputs a first control signal S1, a second control signal S2, a third control signal S3 and a fourth control signal S4 to control the turn-on or turn-off of the first power switch HQ1, the first power switch HQ2, the first power switch HQ3 and the first power switch HQ4, respectively.

Figure 7:
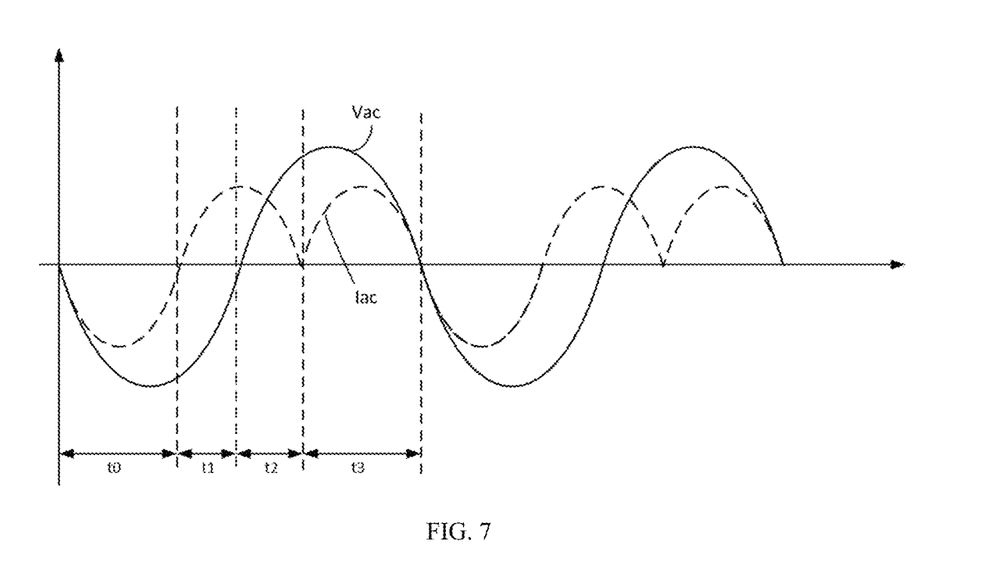
FIG. 7 is a waveform diagram of voltage and the current of the power grid in FIG. 4 and FIG. 6 according to an embodiment of the present disclosure.

In conjunction with FIG. 4 and FIG. 7, FIG. 7 is a waveform diagram of a voltage and a current of the power grid in FIG. 4. The controller receives a reactive power command CM, which may come from a dispatching center; and when the controller 43 selects negative reactive power according to the reactive power command CM, the controller controls corresponding power switches in the inverter bridge to be turned on or off. Specifically, both the second power switch HQ2 and the fourth power switch HQ4 are controlled to be turned on or both the second power switch HQ2 and the fourth power switch HQ4 are controlled to be in a high-frequency switching state within a third time period t0 before the first time period t1 of each power frequency cycle, wherein the third time period is a period from a starting moment of each power frequency cycle to a moment when the current of the power grid crosses zero. At this time, the voltage Vac and the current Iac of the power grid are in phase, and the current Iac of the power grid is a steamed bun wave, that is, the voltage Vac of the power grid is less than 0, the current Iac of the power grid is less than 0, the output power is greater than zero, and the inverter bridge provides power for the power grid. Both the first power switch HQ1 and the fourth power switch HQ4 are controlled to be turned on or both the second power switch HQ2 and the third power switch HQ3 are controlled to be turned on within the first time period t1 of each power frequency cycle, such that the inductor L is short-circuited, the voltage of the power grid is completely added to the inductor L, meeting Vac=L*Δi, and the current of the inductor L rises; at this time, the voltage Vac of the power grid is less than 0, the current Iac of the power grid is greater than 0, the output power is less than zero, the inverter bridge does not output power, but absorbs reactive power from the power grid, and this reactive power exists on the inductor L, so that reactive power support is implemented. When the voltage Vac of the power grid crosses zero, the current of the inductor L reaches a maximum and a change rate is 0. Both the first power switch HQ1 and the fourth power switch HQ4, or both the second power switch HQ2 and the third power switch HQ3 are continuously controlled to be turned on within a second time period t2 after the first time period t1 of each power frequency cycle, such that the reactive power stored in the inductor L is fed back to the power grid, wherein the second time period t2 is a period from a moment when the voltage Vac of the power grid becomes zero to a moment when the current Iac of the power grid becomes zero; at this time, the voltage Vac of the power grid is reversed, that is, Vac is greater than 0, the current of the inductor L decreases and finally decreases to 0, the change of the whole inductor current satisfies Vac=L*Δi; and the voltage Vac of the power grid is completely symmetrical with the slopes before and after this zero crossing point, so that the inductor L can be prevented from being saturated and energy can be released back to the power grid. Both the first power switch HQ1 and the third power switch HQ3 are controlled to be turned on within a fourth time period t3 after the second time period t2 of each power frequency cycle; and at this time, the voltage Vac of the power grid is greater than 0, the current Iac of the power grid is greater than 0, the output power is greater than zero, and the inverter bridge provides power for the power grid. According to this embodiment, reactive power is only stored once in one power frequency cycle, which is more conducive to calculation and control.

Figure 8:
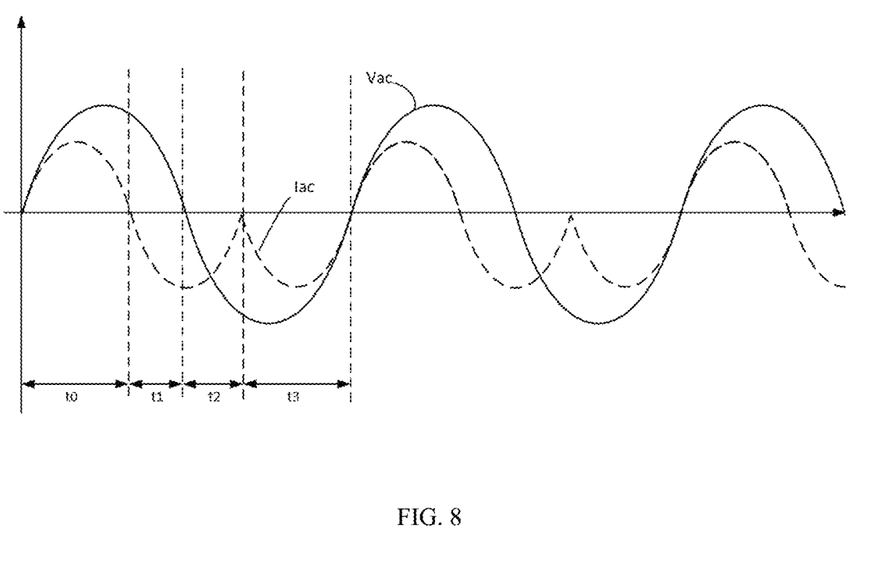
FIG. 8 is a waveform diagram of a voltage and a current of the power grid in FIG. 4 and FIG. 6 according to another embodiment of the present disclosure.

In conjunction with FIG. 4 and FIG. 8, FIG. 8 is a waveform diagram of a voltage and a current of the power grid in FIG. 4. The controller receives a reactive power command CM, which may come from a dispatching center; and when the controller 43 selects positive reactive power according to the reactive power command CM, the controller controls corresponding power switches in the inverter bridge to be turned on or off. Specifically, both the first power switch HQ1 and the third power switch HQ3 are controlled to be turned on or both the first power switch HQ1 and the third power switch HQ3 are controlled to be in a high-frequency switching state within a third time period t0 before the first time period t1 of each power frequency cycle, wherein the third time period t0 is a period from a starting moment of each power frequency cycle to a moment when the current of the power grid crosses zero; and at this time, the voltage Vac and the current Iac of the power grid are in phase, and the current Iac of the power grid is a steamed bun wave, that is, the voltage Vac of the power grid is greater than 0, the current Iac of the power grid is greater than 0, the output power is greater than zero, and the inverter bridge provides power for the power grid. Both the first power switch HQ1 and the fourth power switch HQ4 are controlled to be turned on or both the second power switch HQ2 and the third power switch HQ3 are controlled to be turned on within the first time period t1 of each power frequency cycle, such that the inductor L is short-circuited, the voltage of the power grid is completely added to the inductor L, meeting Vac=L*Δi, and the current of the inductor L rises; at this time, the voltage Vac of the power grid is greater than 0, the current Iac of the power grid is less than 0, the output power is less than zero, the inverter bridge does not output power, but absorbs reactive power from the power grid, and this reactive power stores in the inductor L, so that reactive power support is implemented. When the voltage Vac of the power grid crosses zero, the current of the inductor L reaches a maximum and a change rate is 0. Both the first power switch HQ1 and the fourth power switch HQ4, or both the second power switch HQ2 and the third power switch HQ3 are continuously controlled to be turned on within a second time period t2 after the first time period t1 of each power frequency cycle, such that the reactive power stored in the inductor L is fed back to the power grid, wherein the second time period t2 is a period from a moment when the voltage Vac of the power grid becomes zero to a moment when the current Iac of the power grid becomes zero; at this time, the voltage Vac of the power grid is reversed, that is, Vac is less than 0, the current of the inductor L decreases and finally decreases to 0, the change of the whole inductor current satisfies Vac=L*Δi; and the voltage Vac of the power grid is completely symmetrical with the slopes before and after this zero crossing point, so that the inductor L can be prevented from being saturated and energy can be released back to the power grid. Both the second power switch HQ2 and the fourth power switch HQ4 are controlled to be turned on within a fourth time period t3 after the second time period t2 of each power frequency cycle; and at this time, the voltage Vac of the power grid is less than 0, the current Iac of the power grid is less than 0, the output power is greater than zero, and the inverter bridge provides power for the power grid.

In some embodiments, reactive power only needs to be stored once in one power frequency cycle, which is more conducive to calculation and control compared with the traditional solution which requires storing reactive power twice; and the reactive power is stored in the inductor L, so that the large-capacity electrolytic capacitor is saved and the cost and volume of the system are reduced.

In conjunction with FIG. 4, FIG. 7 and FIG. 8, in some embodiments, the controller controls the duration of the third time period t0 according to the reactive power to be generated by the inverter system. When the voltage received by the inverter bridge is a direct current (DC) voltage and a voltage value is a fixed value (the fixed value here may have a certain ripple, such as a fluctuation of 10% above and below an average voltage), the controller outputs switch control signals for controlling the second power switch HQ2 and the fourth power switch HQ4 or switch control signals for controlling the first power switch HQ1 and the third power switch HQ3 according to the reactive power to be generated by the inverter system; during this period, the second power switch HQ2 and the fourth power switch HQ4 are controlled to be in a high-frequency switching state, or the first power switch HQ1 and the third power switch HQ3 are controlled to be in a high-frequency switching state, such that the current Iac of the power grid is a steamed bun wave within the third time period to, and crosses zero at the end of the third time period t0, and then enters the first time period t1 to store reactive energy in the inductor L, thereby completing reactive power support. Since the third time period t0 and the first time period t1 together form a half power frequency cycle of the voltage Vac of the power grid, it can be seen that the duration of the third time period t0 determines the duration of the first time period t1, which further determines the reactive power to be generated by the inverter system. Therefore, in practical application, the controller 43 may control the duration of the third time period t0 by high-frequency switch control signals for controlling the second power switch HQ2 and the fourth power switch HQ4 or high-frequency switch control signals for controlling the first power switch HQ1 and the third power switch HQ3 according to the reactive power to be generated by the inverter system, and then control the duration of the first time period t1.

In some embodiments, the inductor L is connected between the second end of the first power switch HQ1 and a first end of the power grid; or the inductor L is connected between the second end of the fourth power switch HQ4 and a second end of the power grid.

In some embodiments, the inductor includes a first inductor and a second inductor, wherein the first inductor is connected between the second end of the first power switch HQ1 and the first end of the power grid, and the second inductor is connected between the second end of the fourth power switch HQ4 and the second end of the power grid.

Figure 5:
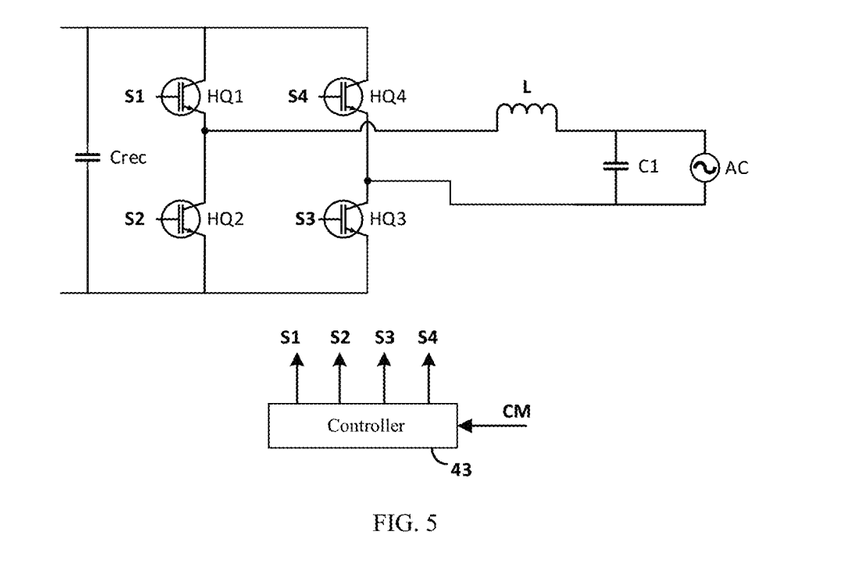
FIG. 5 is a schematic structural diagram of an inverter system with reactive power support according to another embodiment of the present disclosure.

Referring to FIG. 5, in some embodiments, the inverter system further includes a small-capacity filter capacitor Crec, wherein the filter capacitor Crec is connected between the first end of the first power switch HQ1 and the second end of the second power switch HQ2 for reducing high-frequency ripples flowing into the power grid. The small-capacity capacitor may be a thin film capacitor, a ceramic capacitor, or a high-molecular polymer capacitor, etc., and a capacitance value of the capacitor is several pF to several tens of pF. In this embodiment, the capacitance value of the filter capacitor Crec is much smaller than that of the electrolytic capacitor in the prior art, so that the filter capacitor cannot be used to do reactive power support. In this embodiment, the inductor L is used as a reactive power absorption element and may be well applied to the inverter system without requiring the large-capacity electrolytic capacitor, so that the reduction of the volume and cost of the system is facilitated.

Figure 6:
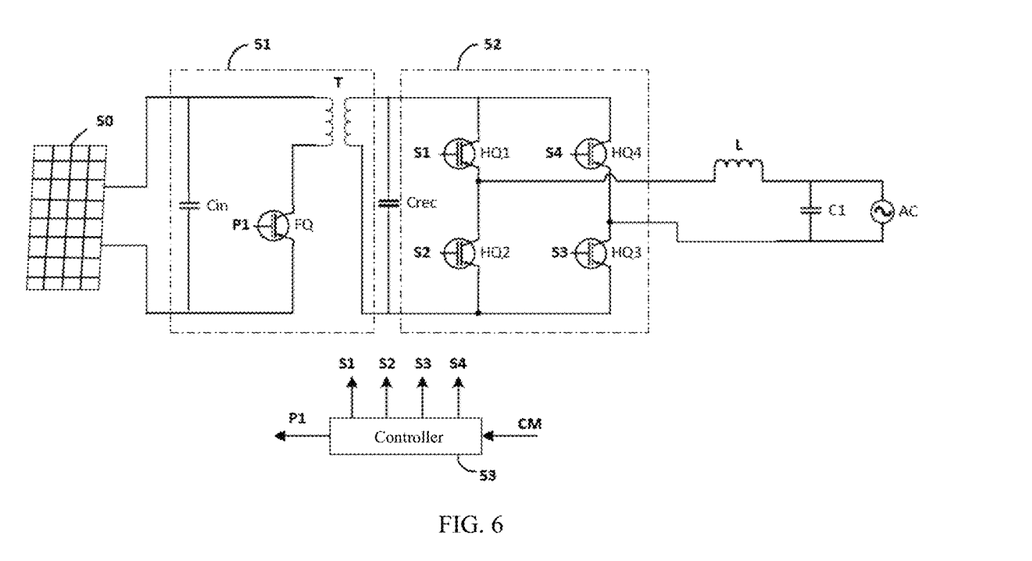
FIG. 6 is a schematic structural diagram of an inverter system with reactive power support according to yet another embodiment of the present disclosure.

Referring to a structural schematic diagram of an inverter system with reactive power support according to another embodiment of the present disclosure shown in FIG. 6, the inverter system with reactive power support further includes a converter 51, an input end of the converter is connected with an external power supply, such as a solar panel PV, an output end of the converter 51 is connected with an input end of the inverter bridge 52, and the controller is connected with a power switch FQ of the converter. The waveforms of the voltage and the current of its power grid may refer to FIG. 7 and FIG. 8.

When the DC voltage output by the converter 51 is a DC steamed bun wave, that is, when the DC voltage received by the inverter bridge 52 is a DC steamed bun wave, the controller can control the power switch FQ of the converter 51 according to the reactive power to be generated by the inverter system to control the duration of the third time period to. The controller 53 may output a control signal P1 to control the power switch FQ of the converter 51, such that the current Iac of the power grid is a steamed bun wave within the third time period to, and crosses zero at the end of the third time period t0, and then enters the first time period t1 to store reactive energy in the inductor L, thereby completing reactive power support; within the third time period t0, the first power switch HQ1 and the third power switch HQ3, or the second power switch HQ2 and the fourth power switch HQ4, are correspondingly controlled to be turned on. Similarly, since the third time period t0 and the first time period t1 together form a half power frequency cycle of the voltage Vac of the power grid, it can be seen that the duration of the third time period t0 determines the duration of the first time period t1, which further determines the reactive power to be generated by the inverter system. Therefore, in practical application, the controller 53 may control the power switch FQ of the converter 51 according to the reactive power to be generated by the inverter system, so as to control the duration of the third time period t0, and then control the duration of the first time period t1.

As shown in FIG. 6, the controller 53 also outputs control signals S1, S2, S3 and S4 to control the turn-on or turn-off of the first power switch HQ1, the second power switch HQ2, the third power switch HQ3 and the fourth power switch HQ4.

In some embodiments, the converter 51 may be an isolated converter circuit, such as an LLC or a flyback, or a non-isolated converter circuit, such as buck or boost.

With continued reference to FIG. 6, the converter 51 is the flyback, including an input capacitor Cin, a transformer T and a power switch FQ. A second end of a primary winding of transformer T is connected with a first end of the power switch FQ, a first end of the input capacitor Cin is connected with a first end of a primary winding of the transformer T, a second end of the input capacitor Cin is connected with the second end of the power switch, two ends of the input capacitor Cin are connected with a solar panel PV in parallel, a first end of a secondary winding of the transformer T is connected with the first end of first power switch HQ1, and a second end of the secondary winding of the transformer T is connected with the second end of second power switch HQ2. The converter 51 can output the steamed bun wave-shaped direct current or the direct current with a fixed voltage value.

In some embodiments, the inverter bridge further includes a fifth power switch and a sixth power switch; a first end of the fifth power switch is connected with the first end of the fourth power switch, a second end of the fifth power switch is connected with a first end of the sixth power switch, and a second end of the sixth power switch is connected with the second end of the third power switch; and the controller is respectively connected with a control end of the fifth power switch and a control end of the sixth power switch to form a three-phase inverter bridge. Because of the three-phase balance of the three-phase inverter bridge, an input end of the three-phase inverter bridge does not need a large-capacity electrolytic capacitor. In the prior art, in order to complete reactive power support, the large-capacity electrolytic capacitor is specially added at the input end of the three-phase inverter bridge. By using the existing inductor of the inverter system in the present application to complete reactive power support, there is no need to add the large-capacity electrolytic capacitor specially, so that the cost and the volume of the inverter system are greatly reduced.

The present application also provides a control method of an inverter system with reactive power support. As shown in FIG. 4, the inverter system includes an inverter bridge, wherein the inverter bridge includes a first power switch HQ1, a second power switch HQ2, a third power switch HQ3 and a fourth power switch HQ4, a first end of the first power switch HQ1 is connected with a first end of the fourth power switch HQ4, a second end of the first power switch HQ1 is connected with a first end of the second power switch HQ2, a second end of the fourth power switch HQ4 is connected with a first end of the third power switch HQ3, and a second end of the second power switch HQ2 is connected with a second end of the third power switch HQ3;
  an inductor L connected between the inverter bridge and a power grid AC; and
  a controller respectively connected with a control end of the first power switch HQ1, a control end of the second power switch HQ2, a control end of the third power switch HQ3 and a control end of the fourth power switch HQ4.

The control method includes: controlling both the second power switch HQ2 and the third power switch HQ3 to be turned on or controlling both the first power switch HQ1 and the fourth power switch HQ4 to be turned on within a first time period of each power frequency cycle, wherein the first time period t1 is a period from a moment when a current of the power grid AC becomes zero to a moment when a voltage of the power grid AC becomes zero, and the current Iac of the power grid and the voltage Vac of the power grid are inverted within the first time period, so that reactive power of the power grid AC is stored in the inductor L.

Specifically, in conjunction with FIG. 4 and FIG. 7, when the controller 43 receives a reactive power command CM and selects negative reactive power according to the reactive power command CM, the controller controls both the first power switch HQ1 and the fourth power switch HQ4 are controlled to be turned on or both the second power switch HQ2 and the third power switch HQ3 to be turned on within the first time period t1 of each power frequency cycle, such that the inductor L is short-circuited, the voltage of the power grid is completely added to the inductor L, meeting Vac=L*Δi, and the current of the inductor L rises; at this time, the voltage Vac of the power grid is less than 0, the current Iac of the power grid is greater than 0, the output power is less than zero, the inverter bridge does not output power, but absorbs reactive power from the power grid, and this reactive power stores in the inductor L, so that reactive power support is implemented. When the voltage Vac of the power grid crosses zero, the current of the inductor L reaches a maximum and a change rate is 0.

Specifically, in conjunction with FIG. 4 and FIG. 8, when the controller 43 receives a reactive power command CM and selects positive reactive power according to the reactive power command CM, both the first power switch HQ1 and the fourth power switch HQ4 are controlled to be turned on or both the second power switch HQ2 and the third power switch HQ3 are controlled to be turned on within the first time period t1 of each power frequency cycle, such that the inductor L is short-circuited, the voltage of the power grid is completely added to the inductor L, meeting Vac=L*Δi, and the current of the inductor L rises; at this time, the voltage Vac of the power grid is greater than 0, the current Iac of the power grid is less than 0, the output power is less than zero, the inverter bridge does not output power, but absorbs reactive power from the power grid, and this reactive power stores in the inductor L, so that reactive power support is implemented. When the voltage Vac of the power grid crosses zero, the current of the inductor L reaches a maximum and a change rate is 0.

In some embodiments, the control method further includes: controlling both the second power switch and the third power switch to be turned on or both the first power switch and the fourth power switch to be turned on within a second time period after the first time period, such that the reactive power stored by the inductor is fed back to the power grid, wherein the second time period is a period from a moment when the voltage of the power grid becomes zero to a moment when the current of the power grid becomes zero.

Specifically, in conjunction with FIG. 4 and FIG. 7, when the controller 43 receives a reactive power command CM and selects negative reactive power according to the reactive power command CM, the controller continuously controls both the first power switch HQ1 and the fourth power switch HQ4, or both the second power switch HQ2 and the third power switch HQ3 to be turned on within a second time period t2 after the first time period t1 of each power frequency cycle, such that the reactive power stored in the inductor L is fed back to the power grid, wherein the second time period t2 is a period from a moment when the voltage Vac of the power grid becomes zero to a moment when the current Iac of the power grid becomes zero; at this time, the voltage Vac of the power grid is reversed, that is, Vac is greater than 0, the current of the inductor L decreases and finally decreases to 0, the change of the whole inductor current satisfies Vac=L*Δi; and the voltage Vac of the power grid is completely symmetrical with the slopes before and after this zero crossing point, so that the inductor L can be prevented from being saturated and energy can be released back to the power grid.

Specifically, in conjunction with FIG. 4 and FIG. 8, when the controller 43 receives a reactive power command CM and selects positive reactive power according to the reactive power command CM, both the first power switch HQ1 and the fourth power switch HQ4, or both the second power switch HQ2 and the third power switch HQ3 are continuously controlled to be turned on within a second time period t2 after the first time period t1 of each power frequency cycle, such that the reactive power stored in the inductor L is fed back to the power grid, wherein the second time period t2 is a period from a moment when the voltage Vac of the power grid becomes zero to a moment when the current Iac of the power grid becomes zero; at this time, the voltage Vac of the power grid is reversed, that is, Vac is less than 0, the current of the inductor L decreases and finally decreases to 0, the change of the whole inductor current satisfies Vac=L*Δi; and the voltage Vac of the power grid is completely symmetrical with the slopes before and after this zero crossing point, so that the inductor L can be prevented from being saturated and energy can be released back to the power grid.

In some embodiments, the control method further includes: within a third time period before the first time period, controlling both the first power switch and the third power switch to be turned on or both the first power switch and the third power switch to be in a high-frequency switching state, or, controlling both the second power switch and the fourth power switch to be turned on or both the second power switch and the fourth power switch to be in a high-frequency switching state, such that the inverter bridge provides active power to the power grid, wherein the third time period is a period from a starting moment of each power frequency cycle to a moment when the current of the power grid crosses zero.

Specifically, in conjunction with FIG. 4 and FIG. 7, when the controller 43 receives a reactive power command CM and selects negative reactive power according to the reactive power command CM, the controller controls both the second power switch HQ2 and the fourth power switch HQ4 to be turned on or both the second power switch HQ2 and the fourth power switch HQ4 to be in a high-frequency switching state within a third time period t0 before the first time period t1 of each power frequency cycle, wherein the third time period t0 is a period from a starting moment of each power frequency cycle to a moment when the current of the power grid crosses zero; and at this time, the voltage Vac and the current Iac of the power grid are in phase, and the current Iac of the power grid is a steamed bun wave, that is, the voltage Vac of the power grid is less than 0, the current Iac of the power grid is less than 0, the output power is greater than zero, and the inverter bridge provides power for the power grid.

Specifically, in conjunction with FIG. 4 and FIG. 8, when the controller 43 receives a reactive power command CM and selects positive reactive power according to the reactive power command CM, both the first power switch HQ1 and the third power switch HQ3 are controlled to be turned on or both the first power switch HQ1 and the third power switch HQ3 are controlled to be in a high-frequency switching state in a third time period t0 before the first time period t1 of each power frequency cycle, wherein the third time period is a period from a starting moment of each power frequency cycle to a moment when the current of the power grid crosses zero; and at this time, the voltage Vac and the current Iac of the power grid are in phase, and the current Iac of the power grid is a steamed bun wave, that is, the voltage Vac of the power grid is greater than 0, the current Iac of the power grid is greater than 0, the output power is greater than zero, and the inverter bridge provides power for the power grid.

In some embodiments, the control method further includes: within a fourth time period after the second time period, controlling both the first power switch and the third power switch to be turned on or both the second power switch and the fourth power switch to be turned on, such that the inverter bridge provides active power to the power grid, wherein the fourth time period is a period from a moment when the current of the power grid crosses zero to a moment when the current and voltage of the power grid both cross zero.

Specifically, in conjunction with FIG. 4 and FIG. 7, when the controller 43 receives a reactive power command CM and selects negative reactive power according to the reactive power command CM, the controller controls both the first power switch HQ1 and the third power switch HQ3 to be turned on within a fourth time period t3 after the second time period of each power frequency cycle; and at this time, the voltage Vac of the power grid is greater than 0, the current Iac of the power grid is greater than 0, the output power is greater than zero, and the inverter bridge provides power for the power grid.

Specifically, in conjunction with FIG. 4 and FIG. 8, when the controller 43 receives a reactive power command CM and selects positive reactive power according to the reactive power command CM, both the second power switch HQ2 and the fourth power switch HQ4 are controlled to be turned on within a fourth time period t3 after the second time period of each power frequency cycle; and at this time, the voltage Vac of the power grid is less than 0, the current Iac of the power grid is less than 0, the output power is greater than zero, and the inverter bridge provides power for the power grid.

In some embodiments, in conjunction with FIG. 4, FIG. 7 and FIG. 8, the controller controls the duration of the third time period t0 according to the reactive power to be generated by the inverter system. When the voltage received by the inverter bridge is a DC voltage and a voltage value is a fixed value (the fixed value here may have a certain ripple, such as a fluctuation of 10% above and below an average voltage), the controller, according to the reactive power to be generated by the inverter system, outputs switch control signals for controlling the second power switch HQ2 and the fourth power switch HQ4, during this period, the second power switch HQ2 and the fourth power switch HQ4 are in a high-frequency switching state, or outputs switch control signals for controlling the first power switch HQ1 and the third power switch HQ3; during this period, the first power switch HQ1 and the third power switch HQ3 are in a high-frequency switching state, such that the current Iac of the power grid is a steamed bun wave within the third time period t0, and crosses zero at the end of the third time period t0, and then enters the first time period t1 to store reactive energy in the inductor L, thereby completing reactive power support. Since the third time period t0 and the first time period t1 together form a half power frequency cycle of the voltage Vac of the power grid, it can be seen that the duration of the third time period t0 determines the duration of the first time period t1, which further determines the reactive power to be generated by the inverter system. Therefore, in practical application, the controller 43 may control the duration of the third time period t0 by high-frequency switch control signals for controlling the second power switch HQ2 and the fourth power switch HQ4 or high-frequency switch control signals for controlling the first power switch HQ1 and the third power switch HQ3 according to the reactive power to be generated by the inverter system, and then control the duration of the first time period t1.

In some embodiments, reactive power needs to be stored once in one power frequency cycle, which is more conducive to calculation and control compared with the traditional solution which requires storing reactive power twice; and the reactive power is stored in the inductor L, which may be well applied to the inverter system without or without requiring the large-capacity electrolytic capacitor, so that the large-capacity electrolytic capacitor is saved and the cost and volume of the system are reduced.

In some embodiments, the inverter system further includes a converter, an input end of the converter is connected with an external power supply, an output end of the converter is connected with an input end of the inverter bridge, and the controller is connected with a power switch of the converter; and the control method further comprises controlling the power switch of the converter to control the duration of the third time period to.

Specifically, as shown in FIG. 6, the inverter system with reactive power support further includes a converter 51, an input end of the converter is connected with an external power supply, such as a solar panel PV, an output end of the converter 51 is connected with an input end of the inverter bridge 52, and the controller is connected with a power switch FQ of the converter. The waveforms of the voltage and the current of its power grid may refer to FIG. 7 and FIG. 8.

When the DC voltage output by the converter 51 is a DC steamed bun wave, that is, when the DC voltage received by the inverter bridge 52 is a DC steamed bun wave, the controller 53 controls the power switch FQ of the converter 51 according to the reactive power to be generated by the inverter system to control the duration of the third time period t0.

According to the control method of the inverter system with reactive power support in this embodiment, the inverter system is controlled to store reactive power only once in one power frequency cycle, which is more conducive to calculation and control compared with the traditional solution which requires storing reactive power twice; and the reactive power is stored in the inductor L, so that the large-capacity electrolytic capacitor is saved and the cost and volume of the system are reduced.

The present application takes a single-phase inverter bridge as an example to explain the principle, which may also be a three-phase inverter bridge. Because three phases of the three-phase inverter bridge itself are balanced, there is no need to connect an electrolytic capacitor in parallel at an input end of the inverter bridge, but in order to do reactive power support, the electrolytic capacitor is connected in parallel at the input end of the inverter bridge to absorb reactive power in the prior art, thus increasing the volume of the system and the cost of the system. According to the technical solution of the present application, the AC current crosses zero in advance by controlling the power switch in a positive or negative half cycle of the AC voltage, such that the AC voltage and the AC current in waveforms of the AC voltage and the AC current are inverted for a period of time, and the inductor in the inverting time period is controlled to be short-circuited, so that the reactive power is stored in the inductor; in addition, the inductor is controlled to release the reactive power to the power grid after the inverting time period, so that the purpose of reactive power support is achieved, and the volume and cost of a three-phase inverter system are reduced.

Finally, it should be noted that the above embodiments are only used to illustrate the technical solutions of the present disclosure, and not to limit the same; while the present disclosure has been described in detail with reference to the foregoing embodiments, it will be understood by those skilled in the art that the technical solutions described in the foregoing embodiments may still be modified, or some or all of the technical features may be equivalently substituted; and these modifications or substitutions do not make the essence of the corresponding technical solutions deviate from the scope of the technical solutions of various embodiments of the present disclosure.

What is claimed is:

1. An inverter system with reactive power support, comprising:
   an inverter bridge comprising a first power switch, a second power switch, a third power switch and a fourth power switch, wherein a first end of the first power switch is connected to a first end of the fourth power switch, a second end of the first power switch is connected to a first end of the second power switch, a second end of the fourth power switch is connected to a first end of the third power switch, a second end of the second power switch is connected to a second end of the third power switch, and an input end of the inverter bridge is not connected to a bus capacitor;
   an inductor connected between the inverter bridge and a power grid; and
   a controller respectively connected to a control end of the first power switch, a control end of the second power switch, a control end of the third power switch and a control end of the fourth power switch, the controller being configured to control both the second power switch and the third power switch to be turned on or both the first power switch and the fourth power switch to be turned on within a first time period of each power frequency cycle, wherein the first time period is a period from a moment when a current of the power grid crosses zero to a moment when a voltage of the power grid crosses zero, and the current of the power grid and the voltage of the power grid are inverted within the first time period such that reactive power is stored in the inductor.

2. The inverter system with reactive power support according to claim 1, wherein the controller is further configured to control a duration of a third time period which is before the first time period according to the reactive power generated by the inverter system, and wherein the voltage and the current of the power grid are in phase within the third time period, and the current of the power grid is a steamed bun wave.

3. The inverter system with reactive power support according to claim 2, wherein the controller is further configured to control, within the third time period, the duration of the third time period by outputting high-frequency switch control signals to control the first power switch and the third power switch, or by outputting high-frequency switch control signals to control the second power switch and the fourth power switch.

4. The inverter system with reactive power support according to claim 2, wherein the inverter system further comprises a converter, an input end of the converter is connected to an external power supply, an output end of the converter is connected to the input end of the inverter bridge, and the controller is connected to a power switch of the converter.

5. The inverter system with reactive power support according to claim 4, wherein the controller is configured to control, within the third time period, the duration of the third time period by outputting a switch control signal to control the power switch of the converter.

6. The inverter system with reactive power support according to claim 4, wherein the converter is a flyback, an LLC, buck, or boost.

7. The inverter system with reactive power support according to claim 1, wherein the controller is further configured to control both the second power switch and the third power switch to be turned on or both the first power switch and the fourth power switch to be turned on within a second time period that is after the first time period, such that the reactive power stored in the inductor is fed back to the power grid, wherein the second time period is a period from a moment when the voltage of the power grid crosses zero to a moment when the current of the power grid crosses zero.

8. The inverter system with reactive power support according to claim 1, wherein the inductor is connected between the second end of the first power switch and a first end of the power grid; or the inductor is connected between the second end of the fourth power switch and a second end of the power grid.

9. The inverter system with reactive power support according to claim 1, wherein the inductor comprises a first inductor and a second inductor, the first inductor is connected between the second end of the first power switch and a first end of the power grid, and the second inductor is connected between the second end of the fourth power switch and a second end of the power grid.

10. The inverter system with reactive power support according to claim 1, further comprising a filter capacitor, wherein the filter capacitor is connected between the first end of the first power switch and the second end of the second power switch, and a capacitance value of the filter capacitor ranges from tens of nF to hundreds of nF.

11. The inverter system with reactive power support according to claim 10, wherein the filter capacitor is a thin film capacitor, a high-voltage ceramic capacitor or a high-molecular polymer capacitor.

12. The inverter system with reactive power support according to claim 1, wherein the inverter bridge further comprises a fifth power switch and a sixth power switch; a first end of the fifth power switch is connected to the first end of the fourth power switch, a second end of the fifth power switch is connected to a first end of the sixth power switch, and a second end of the sixth power switch is connected to the second end of the third power switch; and the controller is respectively connected to a control end of the fifth power switch and a control end of the sixth power switch.

13. A control method of an inverter system with reactive power support, wherein the inverter system comprises an inverter bridge, an inductor and a controller; the inverter bridge comprises a first power switch, a second power switch, a third power switch and a fourth power switch; a first end of the first power switch is connected to a first end of the fourth power switch, a second end of the first power switch is connected to a first end of the second power switch, a second end of the fourth power switch is connected to a first end of the third power switch, and a second end of the second power switch is connected to a second end of the third power switch; an input end of the inverter bridge is not connected to a bus capacitor; an inductor is connected between the inverter bridge and a power grid; the controller is respectively connected to the first power switch, the second power switch, the third power switch and the fourth power switch; and the control method comprises:

controlling, with the controller, both the second power switch and the third power switch to be turned on or both the first power switch and the fourth power switch to be turned on within a first time period of each power frequency cycle, wherein the first time period is a period from a moment when a current of the power grid crosses zero to a moment when a voltage of the power grid crosses zero, and the current of the power grid and the voltage of the power grid are inverted within the first time period such that reactive power is stored in the inductor.

14. The control method according to claim 13, further comprising:

controlling, with the controller, a duration of a third time period before the first time period according to the reactive power generated by the inverter system, wherein the voltage and the current of the power grid are in phase within the third time period, and the current of the power grid is a steamed bun wave.

15. The control method according to claim 14, further comprising:

controlling, within the third time period, the duration of the third time period by outputting high-frequency switch control signals to control the first power switch and the third power switch or by outputting high-frequency switch control signals to control the second power switch and the fourth power switch.

16. The control method according to claim 14, wherein the inverter system further comprises a converter, an input end of the converter is connected to an external power supply, an output end of the converter is connected to the input end of the inverter bridge, and the controller is connected to a power switch of the converter; and the control method further comprises controlling the power switch of the converter to control the duration of the third time period.

17. The control method according to claim 13, further comprising:

controlling, both the second power switch and the third power switch to be turned on or both the first power switch and the fourth power switch to be turned on within a second time period that is after the first time period, such that the reactive power stored in the inductor is fed back to the power grid, wherein the second time period is a period from a moment when the voltage of the power grid crosses zero to a moment when the current of the power grid crosses zero.

18. The control method according to claim 15, further comprising:
- controlling, within a third time period before the first time period, both the first power switch and the third power switch to be turned on or both the second power switch and the fourth power switch to be turned on, such that the inverter bridge provides active power to the power grid, wherein the third time period is a period from a starting moment of each power frequency cycle to a moment when the current of the power grid crosses zero; and
- controlling, within a fourth time period after the second time period, both the first power switch and the third power switch to be turned on or both the second power switch and the fourth power switch to be turned on, such that the inverter bridge provides active power to the power grid, wherein the fourth time period is a period from a moment when the current of the power grid crosses zero to a moment when the current and voltage of the power grid both cross zero.

\* \* \* \* \*

UNITED STATES PATENT AND TRADEMARK OFFICE
CERTIFICATE OF CORRECTION

| | | |
|---|---|---|
| PATENT NO. | : 12,160,107 B1 | Page 1 of 1 |
| APPLICATION NO. | : 18/666783 | |
| DATED | : December 3, 2024 | |
| INVENTOR(S) | : Chongfeng Zheng et al. | |

It is certified that error appears in the above-identified patent and that said Letters Patent is hereby corrected as shown below:

In the Specification

Column 5, Line 18, cancel the text beginning with "FIG. 8", and ending with "present disclosure" in Column 5, Line 21, and insert the following:

--FIG. 8 is a waveform diagram of a voltage and a current of the power grid in FIG. 4 and FIG. 6 according to another embodiment of the present disclosure.--

Signed and Sealed this
Twenty-first Day of January, 2025

Coke Morgan Stewart
*Acting Director of the United States Patent and Trademark Office*